US012583110B2

(12) United States Patent
Takamura et al.

(10) Patent No.: US 12,583,110 B2
(45) Date of Patent: Mar. 24, 2026

(54) ROBOT CONTROL SYSTEM

(71) Applicant: DENSO WAVE INCORPORATED, Chita-gun (JP)

(72) Inventors: Noritaka Takamura, Chita-gun (JP); Tetsuya Sato, Chita-gun (JP)

(73) Assignee: Denso Wave Incorporated, Aichi-pref. (JP)

( * ) Notice: Subject to any disclaimer, the term of this patent is extended or adjusted under 35 U.S.C. 154(b) by 244 days.

(21) Appl. No.: 18/324,527

(22) Filed: May 26, 2023

(65) Prior Publication Data

US 2023/0381966 A1     Nov. 30, 2023

(30) Foreign Application Priority Data

May 26, 2022     (JP) ................................. 2022-086363

(51) Int. Cl.
*B25J 9/16*          (2006.01)
(52) U.S. Cl.
CPC ................................... *B25J 9/1664* (2013.01)
(58) Field of Classification Search
CPC ...... B25J 9/1664; B25J 9/1676; B25J 9/1687; B25J 9/1656; G05B 2219/40359; G05B 2219/40552
See application file for complete search history.

(56) References Cited

U.S. PATENT DOCUMENTS

| | | | |
|---|---|---|---|
| 2011/0160907 A1 | 6/2011 | Orita | |
| 2015/0177952 A1* | 6/2015 | Meyer | G06Q 10/06311 |
| | | | 715/739 |
| 2015/0328776 A1 | 11/2015 | Shiratsuchi | |
| 2016/0221196 A1 | 8/2016 | Suzuki | |
| 2017/0014999 A1 | 1/2017 | Noue et al. | |
| 2018/0169864 A1 | 6/2018 | Haddadin | |
| 2024/0198527 A1* | 6/2024 | Oumi | B25J 9/1656 |
| 2024/0300103 A1* | 9/2024 | Ozaki | B25J 9/1687 |

FOREIGN PATENT DOCUMENTS

| | | | |
|---|---|---|---|
| DE | 11 2019 007 404 T5 | 2/2022 | |
| DE | 10 2021 112 485 B3 | 8/2022 | |
| JP | H08249026 A | * | 9/1996 |
| JP | 2019-177435 A | 10/2019 | |

* cited by examiner

*Primary Examiner* — Adam R Mott
*Assistant Examiner* — Matthew C Gammon
(74) *Attorney, Agent, or Firm* — Oliff PLC

(57) ABSTRACT

A robot control system sets a plurality of limit parameter sets for limiting a motion of the robot based on an input by a user, in which each of the plurality of limit parameter sets corresponds to a scene in which the robot moves, and includes a main parameter set and one of a plurality of sub-parameter sets, the main parameter set including at least one limit parameter, each of the plurality of sub-parameter sets including at least one limit parameter, and the plurality of sub-parameter sets being dependent on the main parameter set, applies one of the set plurality of limit parameter sets to the robot, controls a motion of the robot according to applied one of the plurality of limit parameter sets, and switches the plurality of limit parameter sets at least by switching one of the plurality of sub-parameter sets.

8 Claims, 10 Drawing Sheets

<u>1</u>

MAIN SCENE : ROBOT USAGE CONDITION SETTING
· ACTIVATION SETTING OF EACH SAFETY OBSERVATION
· MAXIMUM LOAD MASS
· TOOL NUMBER
· WORKPIECE NUMBER
· MOVABLE RANGE
· MONITORED PART

SUB-SCENE : SAFETY OBSERVATION SETTING

・SCENE SWITCHING CONDITION

・MAXIMUM SPEED

・MAXIMUM TORQUE

・MAXIMUM FORCE

START

ACQUIRE INPUT FROM THE USER                                 S501

BASED ON THE INPUT, SET THE LIMIT PARAMETERS OF
THE MAIN SCENE AND THE SUB-SCENE AS
THE LIMIT PARAMETERS OF THE SCENE                           S502

APPLY THE SET SCENE TO THE ROBOT                           S503

CONTROL THE MOTION OF THE ROBOT ACCORDING TO
THE LIMIT PARAMETERS OF THE APPLIED SCENE                  S504

SWITCH THE SCENE BY
SWITCHING THE LIMIT PARAMETERS OF THE SUB-SCENE            S505

END

ROBOT CONTROL SYSTEM

CROSS-REFERENCE TO RELATED APPLICATION

This application is based on and claims the benefit of priority from earlier Japanese Patent Application No. 2022-086363 filed on May 26, 2022, the description of which is incorporated herein by reference.

BACKGROUND OF THE INVENTION

Technical Field of the Invention

The present disclosure relates to a robot control system.

Related Art

Conventionally, there is a robot control device provided with an upper limit value changing unit that changes at least one of a speed upper limit value and an acceleration upper limit value of a robot according to the type and number of workpieces gripped by a hand, and a motion control unit that controls the motion of the robot such that the speed upper limit value and the acceleration upper limit value set by the upper limit value changing unit are not exceeded (see Patent Literature 1: JP 2017-24095 A).

SUMMARY

It is desirable that limit parameters for limiting the motion of the robot, such as the speed upper limit value described above, are set according to the scene in which the robot is moving. However, in addition to the type and number of workpieces, a scene is a combination of various factors such as the presence or absence of cooperation between the robot and a human and the surrounding environment of the robot. Therefore, the number of such scenes is enormous. In Patent Literature 1, factors other than the type and number of workpieces are not considered. When it is assumed that the user individually sets the limit parameters for such an enormous number of scenes, the user workload associated with setting the limit parameters increases.

The present disclosure has been made in order to solve the problems described above, and a primary object thereof is to provide a robot control system that is capable of reducing the workload associated with setting the limit parameters corresponding to the scene in which a robot is moving.

According to an embodiment of the present disclosure, there is provided a robot control system comprising a processor and a memory, wherein the memory stores a program that is executed by the processor, and the processor sets a plurality of limit parameter sets for limiting a motion of the robot based on an input by a user, in which each of the plurality of limit parameter sets corresponds to a scene in which the robot moves, and includes a main parameter set and one of a plurality of sub-parameter sets, the main parameter set including at least one limit parameter, each of the plurality of sub-parameter sets including at least one limit parameter, and the plurality of sub-parameter sets being dependent on the main parameter set, applies one of the set plurality of limit parameter sets to the robot, controls a motion of the robot according to applied one of the plurality of limit parameter sets, and switches the plurality of limit parameter sets at least by switching one of the plurality of sub-parameter sets.

As described above, since the structure of the limit parameter set corresponding to each scene has a main parameter set and one of a plurality of sub-parameter sets, limit parameters that are shared by a plurality of scenes corresponding to the plurality of sub-parameter sets can be used as the main parameter set. As a result, the user is capable of setting limit parameters that are shared by the plurality of scenes by only setting the main parameter set. In other words, the limit parameters that are shared by the plurality of scenes are set only once. From an alternative viewpoint, it can be said that the number of limit parameters that are set by the user is reduced. Therefore, the workload associated with setting the limit parameters corresponding to the scene in which the robot is moving can be reduced.

BRIEF DESCRIPTION OF THE DRAWINGS

FIG. 4 shows the relationship between a main scene and a sub-scene according to an embodiment of the present disclosure.

FIG. 6 shows a second setting that is prohibited between a main scene and a sub-scene according to an embodiment of the present disclosure.

DETAILED DESCRIPTION OF THE PREFERRED EMBODIMENTS

Figure 1:
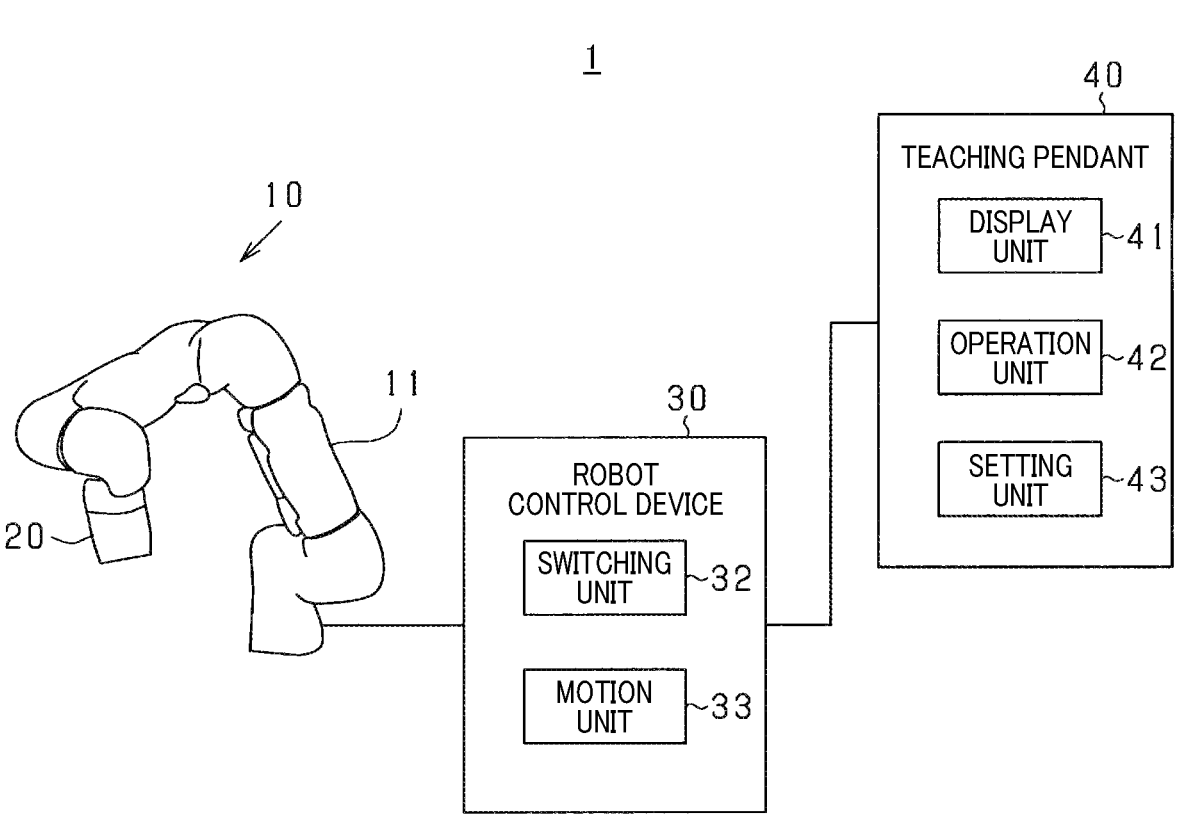
FIG. 1 shows a robot and a robot control system according to an embodiment of the present disclosure.

Hereinafter, a robot that cooperates with humans, and a robot control system that controls the robot will be described as a robot control system 1 according to an embodiment of the present disclosure with reference to the drawings. As shown in FIG. 1, the robot control system 1 includes a robot 10, a robot control device 30, and a teaching pendant 40.

As shown in FIG. 1, the robot 10 is, for example, a vertical articulated robot, and is provided with an arm 11. Adjacent links of the arm 11 are joined in a relatively rotatable fashion via joints. Each joint (that is, each shaft) is driven by a motor that corresponds to the joint. Each joint of the robot 10 is provided with an encoder (not shown) that detects the rotation angle of each joint, and a torque sensor (not shown) that detects the torque of each joint. The robot 10 is not limited to a vertical articulated robot, and may be a horizontal articulated robot.

A hand 20 is attached to the front end of the arm 11. The hand 20 (that is, the tool) includes, for example, a pair of claws, and performs an opening and closing motion that expands and contracts the spacing between the pair of claws.

A workpiece is gripped by the opening and closing motion of the pair of claws of the hand 20.

Figure 9:
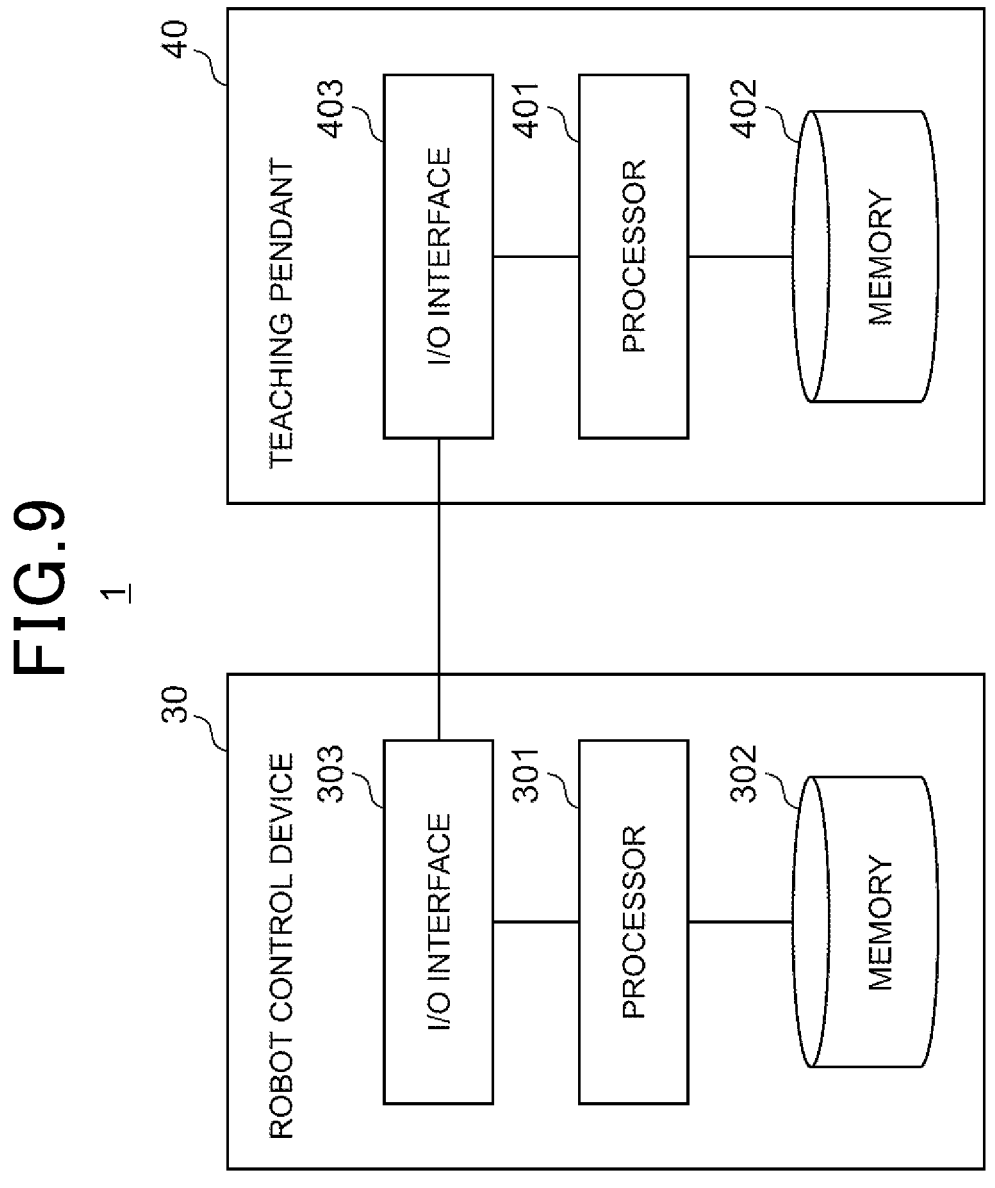
FIG. 9 shows a hardware configuration relating to control of a robot control system according to an embodiment of the present disclosure.

As shown in FIG. 9, the robot control device 30 may be provided with a processor 301 such as a CPU (central processing unit) including a circuit, a memory 302 such as a ROM (read only memory) and a RAM (random access memory), and an input/output interface 303. The robot control device 30 is connected to the robot 10. The robot control device 30 is provided with a switching unit 32 and a motion unit 33. The robot control device 30 realizes the functions of the switching unit 32 and the motion unit 33 and controls the motion of the robot 10 by executing a motion program that causes the robot 10 to move. The robot control device 30 may be built into the robot 10.

The teaching pendant 40 (that is, the operation device) includes a display unit 41, an operation unit 42, and a setting unit 43. The display unit 41 is a display such as a liquid crystal panel, and provides a display relating to the robot 10. The operation unit 42 includes an input interface such as keys, buttons, and dials operated by the user. The setting unit 43 treats the limit parameter set for limiting the motion of the robot 10 as a scene, and sets the limit parameter set based on input from the user. Hereinafter, setting and applying the limit parameter set are respectively also referred to as setting and applying a scene. As shown in FIG. 9, the teaching pendant 40 may be provided with a processor 401 such as a CPU including circuits, a memory 402 such as a ROM and a RAM, and an input/output interface 403.

Input by the user is performed using, for example, the teaching pendant 40 connected to the robot control device 30. The limit parameters include, for example, a movable range of the robot 10 (that is, a movable angle of a target joint), a maximum speed of a monitored part of the robot 10, a maximum torque of a target joint of the robot 10, and the like. A scene corresponds to a combination of a plurality of limit parameters (that is, a limit parameter set). More specifically, a scene corresponds to a combination of a limit parameter set corresponding to a main scene (that is, a main parameter set) and a limit parameter set corresponding to a sub-scene (that is, a sub-parameter set). In addition, the setting unit 43 stores a plurality of main scenes and a plurality of sub-scenes that are dependent on each of the plurality of main scenes. The limit parameter set corresponding to a scene is set using a combination of a limit parameter set corresponding to a main scene and a limit parameter set corresponding to a sub-scene. The switching unit 32 applies one of the plurality of set scenes to the robot 10 and switches the scene by executing a ChangeScene command, which is defined in the motion program described later. The motion unit 33 causes the robot 10 to move in a state where the motion of the robot 10 is limited by the limit parameter set corresponding to the scene applied to the robot 10.

The scene names and the limit parameters are entered and set in an application that is different from the motion program application of the robot 10. For example, the scene names and the limit parameters are input by the user by using the operation unit 42 of the teaching pendant 40, and are associated and registered (that is, set) by the setting unit 43. That is, the setting unit 43 associates the scene names and the limit parameters entered by the user, and registers the associated scene names and limit parameters before creation of the motion program. The scene name and the limit parameters entered by the user being associated and registered by the setting unit 43 corresponds to the setting unit 43 setting the scene based on the limit parameters entered by the user. The scene names are either main scene names or sub-scene names. A sub-scene name indicates the relationship with a main scene on which the sub-scene is dependent. For example, a sub-scene name (such as MS1S1) may include a main scene name (such as MS1).

The user creates (or edits) the motion program, for example, by operating the teaching pendant 40. The motion program may define the scenes that are applied to the robot 10, and the order of the scenes. The ChangeScene command is used to switch scenes in the motion program. ChangeScene is a command executed by the switching unit 32 during execution of the motion program of the robot 10, and is a command for executing setting and switching of a scene. More specifically, ChangeScene may set (that is, create) a scene and switch to the set scene by specifying the values of the limit parameters. ChangeScene may switch to a scene having a specified scene name by specifying the scene name of a scene (that is, a main scene and a sub-scene) that has been set in advance as described above. ChangeScene may set a scene and a scene name as a result of specifying a scene name and specifying the values of the limit parameters, and then switch to the set scene. The setting unit 43 checks the motion program and prepares for execution. For example, when the motion program is created, the setting unit 43 recognizes ChangeScene in the motion program, and sets the motion program including ChangeScene to an executable state. Setting a scene by specifying the limit parameters in ChangeScene during creation of the motion program, or specifying a scene by specifying a preset scene (that is, a main scene and a sub-scene) corresponds to the setting unit 43 setting a scene based on limit parameters input by the user. Therefore, in a broad sense, ChangeScene being defined (that is, input) by the user in the motion program and the setting unit 43 recognizing ChangeScene (or the setting unit 43 setting the motion program including ChangeScene to an executable state) corresponds to the setting unit 43 setting a scene based on limit parameters input by the user. Note that an executable state of the motion program is a state prior to compiling the completed motion program, a state after compiling the motion program, or the like.

Figure 2:
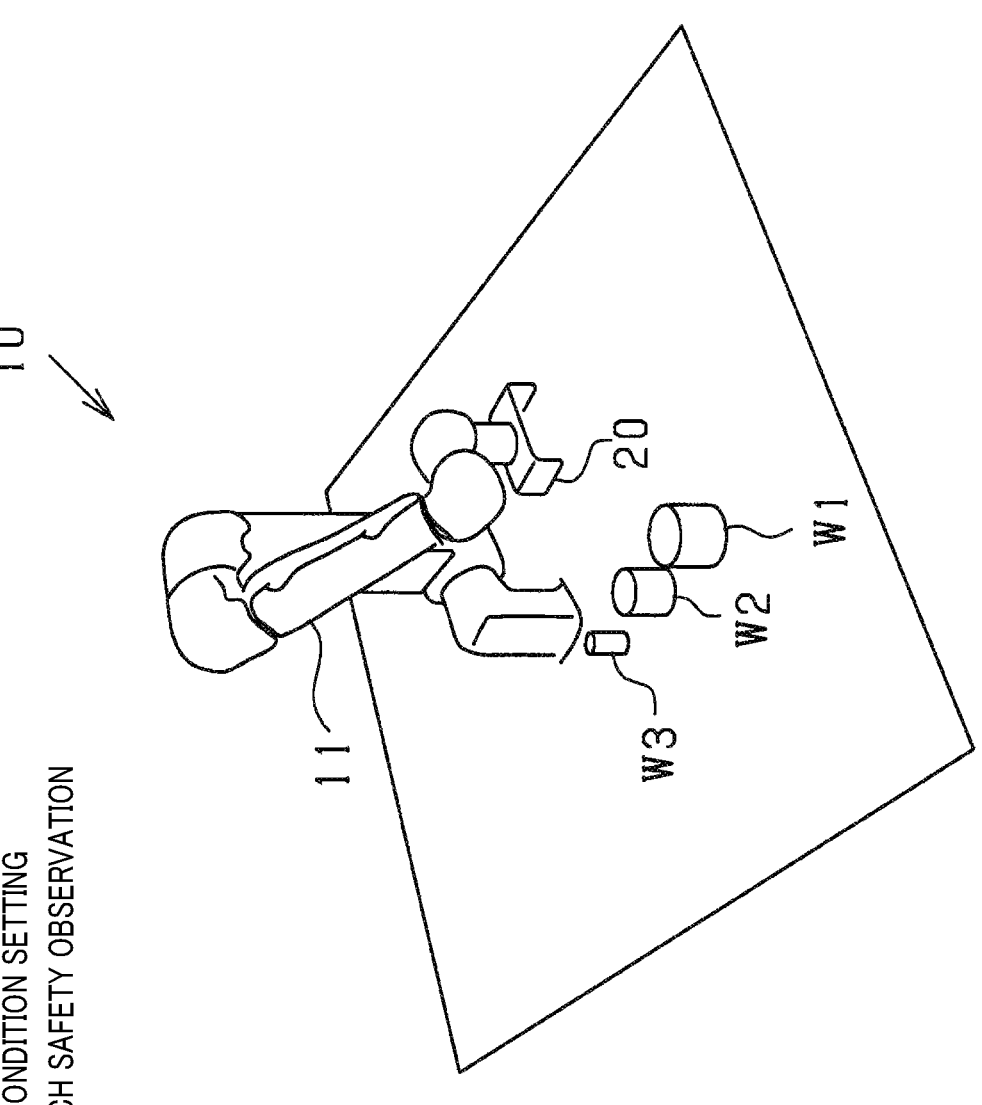
FIG. 2 shows the setting parameters in a main scene according to an embodiment of the present disclosure.

FIG. 2 shows the parameters set in the main scene. In the main scene, parameters relating to the usage conditions of the robot 10 are set. The parameters set in the main scene include, for example, an activation setting of a safety observation, a maximum load mass, a tool number, a workpiece number, a movable range, a monitored part, and the like. The parameters set in the main scene are limit parameters and parameters other than the limit parameters. Furthermore, parameters other than the limit parameters shown in FIG. 2 may also be set.

The activation setting of safety observation indicates whether the parameters set for a safety observation (such as a maximum speed and a maximum torque) are activated or deactivated. The activation setting of a safety observation is set with respect to each parameter of the sub-scene that is dependent on the main scene. The activation setting of each safety observation may be set for each parameter, or may be set for a plurality of parameters. For example, when the maximum speed is activated, the speed of a monitored part of the robot 10 is limited to the maximum speed or less. When the maximum speed is deactivated, the speed of the monitored part of the robot 10 is not limited.

The maximum load mass (an example of a limit parameter) is the maximum total mass of the mass of the hand 20 that is attached to the robot 10, and the mass of the workpiece (that is, one of the workpieces W1 to W3) that is moved by the robot 10. For example, when the maximum load mass is set to 100, and the mass of the hand 20 is 40, then the mass of the workpiece that can be moved by the robot 10 is limited to 60 or less. Note that the value of the maximum load mass described above is an example, and the specific value is arbitrary.

The tool number represents the type of tool that is used by the robot 10. Examples of tools include the hand 20, a suction hand, a welding tool, a grinding tool, and the like. Each tool is assigned a tool number.

The workpiece number indicates the type of workpiece that is subjected to work by the robot 10. For example, each of the workpieces W1 to W3 is assigned a unique workpiece number according to its type.

The movable range (an example of a limit parameter) represents the movable range of the robot 10. The movable range (in other words, the movable area) may be set, for example, using spatial coordinates with the robot 10 as a reference, or may be set using the movable angle of each joint (that is, the target joints) of the robot 10.

The monitored part is a part of the robot 10 that is monitored. As the monitored part, for example, it is possible to set the front end of the arm 11 of the robot 10, a joint of the arm 11, or another predetermined part of the arm 11.

For example, it is defined in the motion program that, in response to changes in the tool used by the robot 10 and the workpiece representing the work target, the main scene is switched to a main scene that corresponds to the tool and workpiece after the change. As a result, it is possible to set the limit parameters such as the activation setting of safety observation, the maximum load mass, and the movable range in response to a change in the mass or type of the tool and workpiece. That is, it is possible to set the limit parameters (such as the maximum speed and the maximum torque) of the sub-scene corresponding to the change through the activation setting of a safety observation corresponding to the change.

Figure 3:
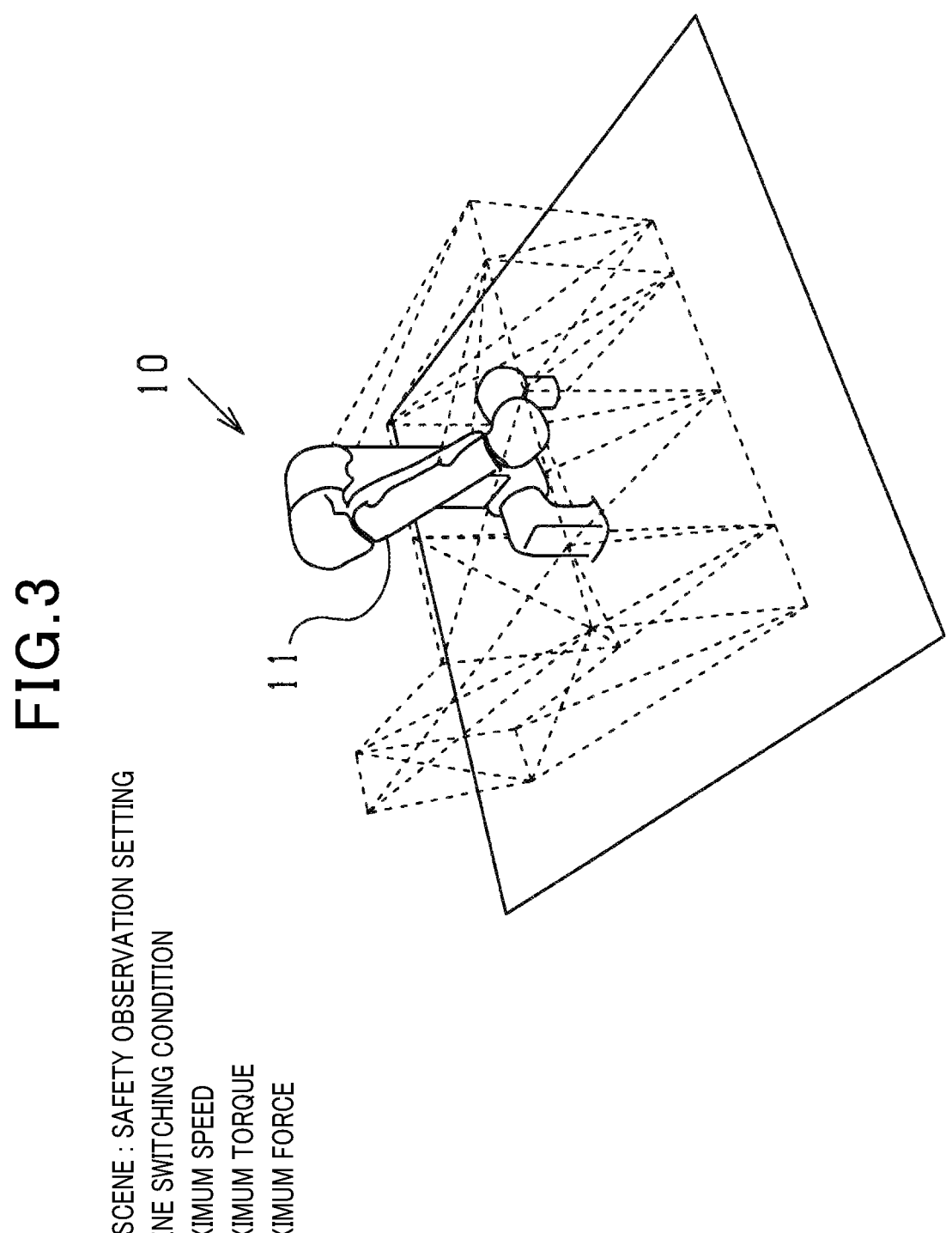
FIG. 3 shows the setting parameters in a sub-scene according to an embodiment of the present disclosure.

FIG. 3 shows the parameters set in the sub-scene. In the sub-scene, parameters relating to safety observation are set. The parameters set in the sub-scene include, for example, a scene switching condition, a maximum speed, a maximum torque, a maximum force, and the like. The parameters set in the sub-scene are limit parameters and parameters other than the limit parameters. Furthermore, parameters other than the limit parameters shown in FIG. 3 may also be set.

In FIG. 3, each movable range set in each main scene is represented by a rectangular parallelepiped with broken lines. The movable area in each main scene corresponds to each movable range (that is, each rectangular parallelepiped). A plurality of sub-scenes are set with respect to each movable range set in each main scene. Specifically, the sub-scenes are set at a level below the main scenes, and are dependent on the main scenes. The plurality of sub-scenes that are included in (that is, dependent on) a main scene share the parameters set in the main scene, which is in the level above the plurality of sub-scenes.

The scene switching condition is a condition that allows switching to that sub-scene (that is, to a scene). For example, the scene switching condition is set based on the position of the robot 10 or the like. For example, when it is determined that the position of the robot 10 is in a predetermined position, it is determined that the condition is satisfied and switching is allowed to the sub-scene. When it is determined that the position of the robot 10 is not in a predetermined position, it is determined that the condition is not satisfied and switching is not allowed to the sub-scene.

The maximum speed (an example of a limit parameter) is the maximum value of the speed of a monitored part of the robot 10. The monitored part is set in the main scene on which the sub-scene is dependent. For example, when the maximum speed is set to 60, the motion unit 33 limits the speed of the monitored part of the robot 10 to a maximum speed of 60 or less. Note that the value of the maximum speed described above is an example, and the specific value is arbitrary. This also applies to the parameters described below.

The maximum torque (an example of a limit parameter) is the maximum value of the torque that is generated by a target joint of the robot 10. The target joint is set in the main scene on which the sub-scene is dependent. For example, when the maximum torque is set to 60, the motion unit 33 limits the torque generated by the target joint of the robot 10 to a maximum torque of 60 or less.

The maximum force (an example of a limit parameter) is the maximum value of the force the robot 10 applies to a workpiece (or a human or piece of equipment). For example, when the maximum force is set to 60, the motion unit 33 limits the force, that the robot 10 applies to the workpiece, to a maximum force of 60 or less.

For example, in common with the plurality of sub-scenes that are dependent on a main scene corresponding to a movable range in which cooperative work is not performed between the robot 10 and a human, the maximum speed and the maximum torque may be set to larger values than in a case where cooperative work is performed. On the other hand, in common with the plurality of sub-scenes that are dependent on a main scene corresponding to a movable range in which cooperative work is performed, the maximum speed and the maximum torque may be set to smaller values than in a case where cooperative work is not performed. Furthermore, in common with the plurality of sub-scenes that are dependent on a main scene that has the workpiece W1, which has a larger mass than the workpiece W3, as the work target, the maximum torque may be set to a larger value and the maximum speed may be set to a smaller value than in the case of the workpiece W3. On the other hand, in common with the plurality of sub-scenes that are dependent on a main scene that has the workpiece W3, which has a smaller mass than the workpiece W1, as the work target, the maximum torque may be set to a smaller value and the maximum speed may be set to a larger value than in the case of the workpiece W1.

Figure 4:
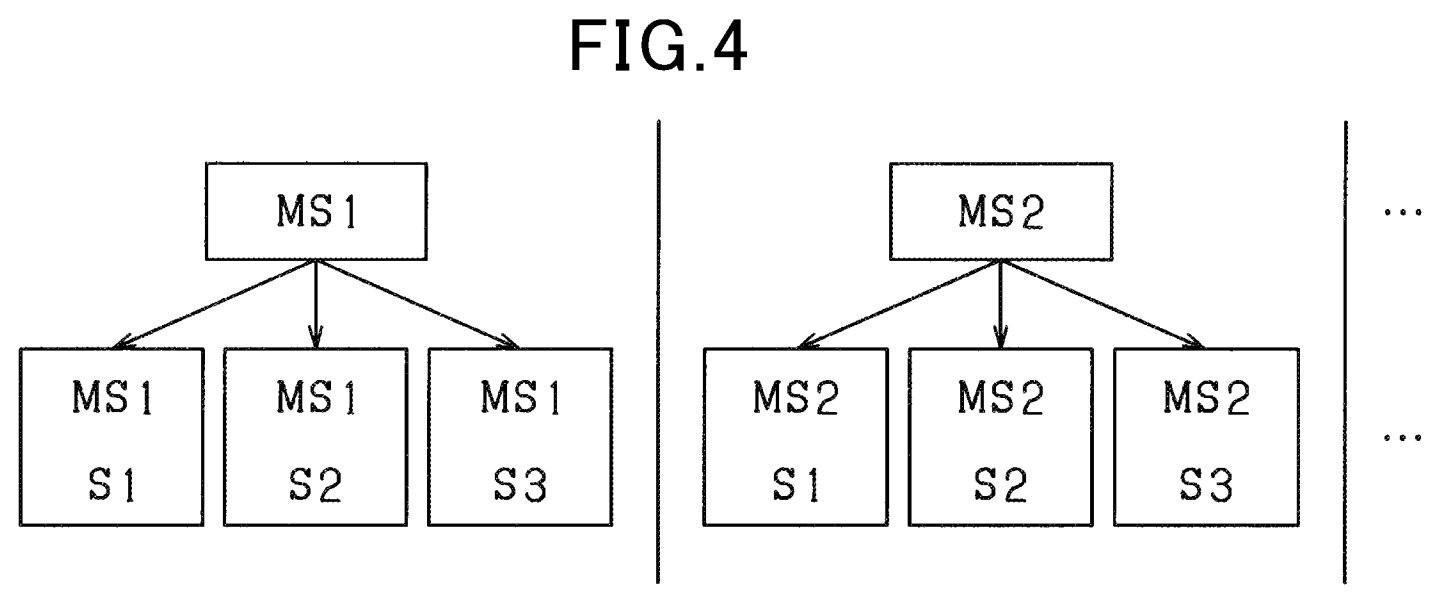

FIG. 4 shows the relationship between main scenes MSn and sub-scenes Sm. Here, n and m are natural numbers.

Each of the sub-scenes Sm is dependent on one of the main scenes MSn. MS1S1 represents the sub-scene S1 within (that is, in the lower level below) the main scene MS1. MS1S1, MS1S2, and MS1S3 are each dependent on the main scene MS1, and share the parameters set in the main scene MS1. MS2S1, MS2S2, and MS2S3 are each dependent on the main scene MS2, and share the parameters set in the main scene MS2. Similarly, MSnSm represents the sub-scene Sm within the main Scene MSn.

Figure 5:
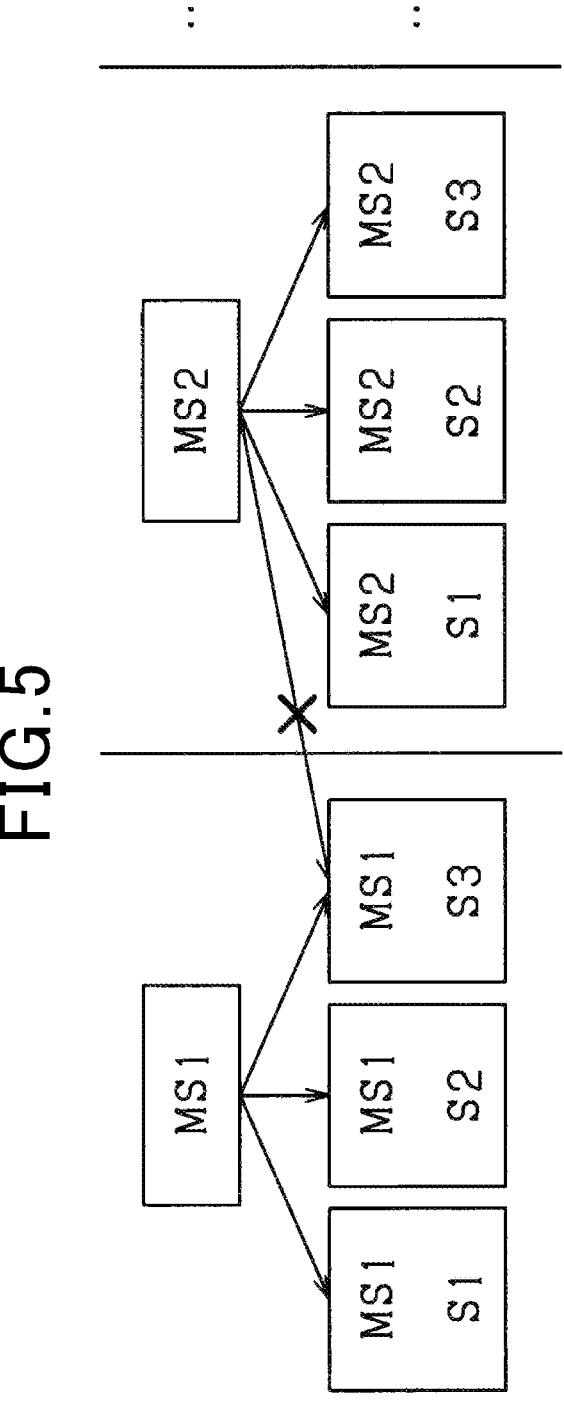
FIG. 5 shows a first setting that is prohibited between a main scene and a sub-scene according to an embodiment of the present disclosure.

As shown in FIG. 5, the setting unit 43 prohibits the user from setting the sub-scene MS1S3, which is dependent on the main scene MS1, to be dependent on the main scene MS2 (a different main scene from the main scene MS1). In other words, the setting unit 43 prohibits the sub-scene MS1S3 set in the main scene MS1 from also being used in the main scene MS2. That is, the setting unit 43 checks that each of the sub-scenes Sm are dependent on just one of the main scenes MSn. As a result, for example, it is possible to prevent the sub-scene MS1S3, which is dependent on the main scene MS1 that corresponds to the workpiece W1 having a larger mass than the workpiece W2, from being used as a sub-scene of the main scene MS2 that corresponds to the workpiece W2.

Figure 6:
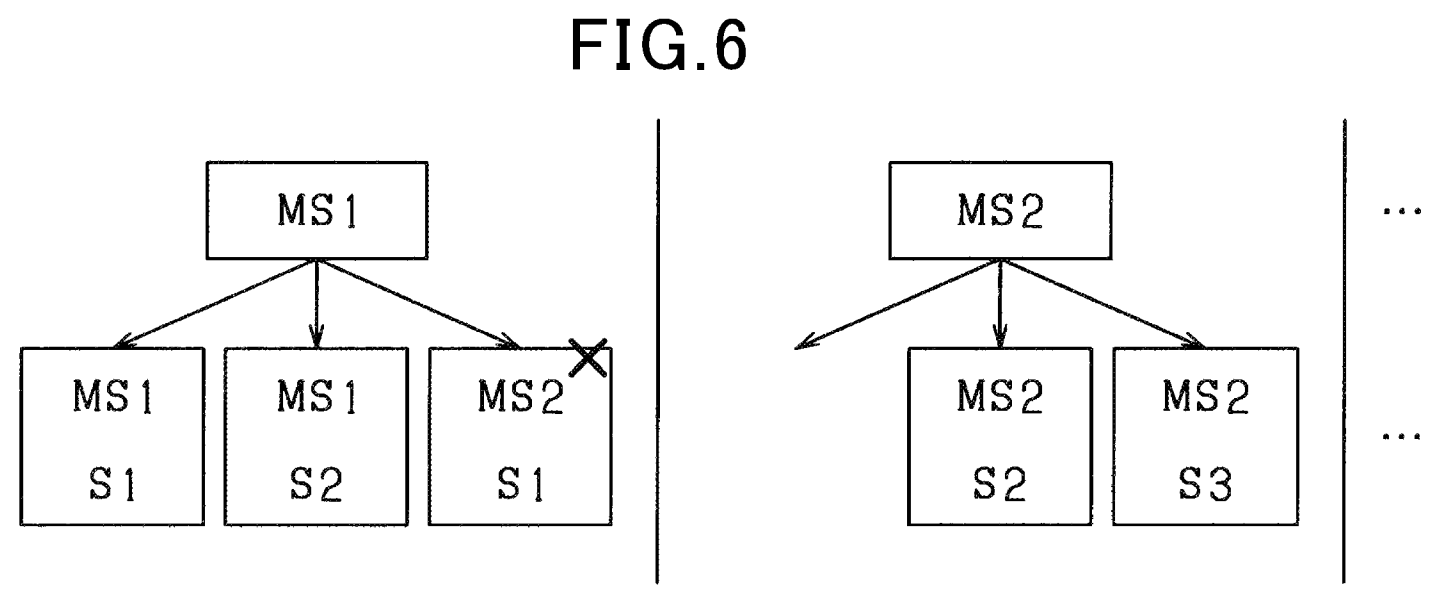

As shown in FIG. 6, the setting unit 43 prohibits the user from setting the sub-scene MS2S1, which corresponds to the main scene MS2 (a different main scene from the main scene MS1), to be dependent on the main scene MS1. That is, the setting unit 43 prohibits the user from setting the sub-scene MS2S1, which does not correspond to the main scene MS1, to be dependent on the main scene MS1. As a result, for example, it is possible to prevent the sub-scene MS2S1, which should be dependent on the main scene MS2 that corresponds to the workpiece W2 having a smaller mass than the workpiece W1, from being used as a sub-scene of the main scene MS1 that corresponds to the workpiece W1.

Figure 7:
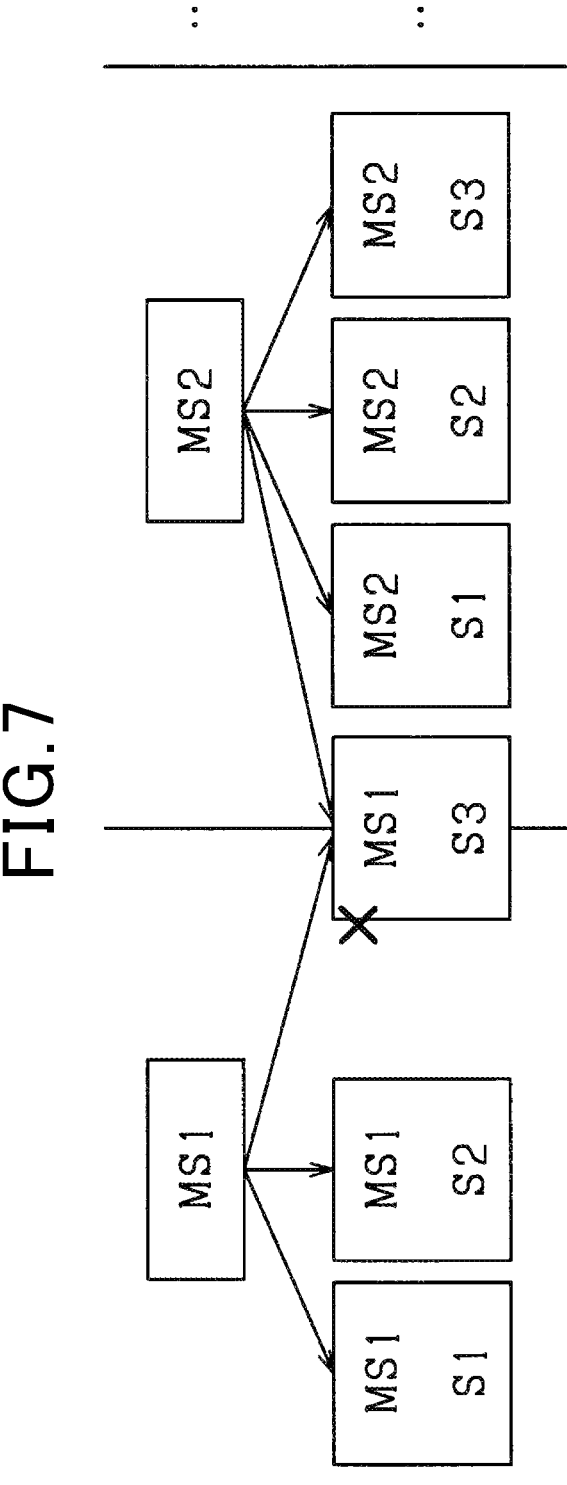
FIG. 7 shows a third setting that is prohibited between a main scene and a sub-scene according to an embodiment of the present disclosure.

As shown in FIG. 7, the setting unit 43 prohibits the user from setting the same sub-scene MS1S3 to be dependent on the main scene MS1 and the main scene MS2. In other words, the setting unit 43 prohibits the user from setting the sub-scene MS1S3, which is not yet dependent on a main scene, to be dependent on a plurality of main scenes MS1 and MS2. That is, the setting unit 43 checks that each of the sub-scenes Sm are dependent on just one of the main scenes MSn. As a result, for example, it is possible to prevent the sub-scene MS1S3, which is set in the main scene MS1 that corresponds to the workpiece W1 having a larger mass than the workpiece W2, from being used as a sub-scene of the main scene MS2 that corresponds to the workpiece W2.

Figure 8:
FIG. 8 shows a prohibited main scene according to an embodiment of the present disclosure.
Figure 8:
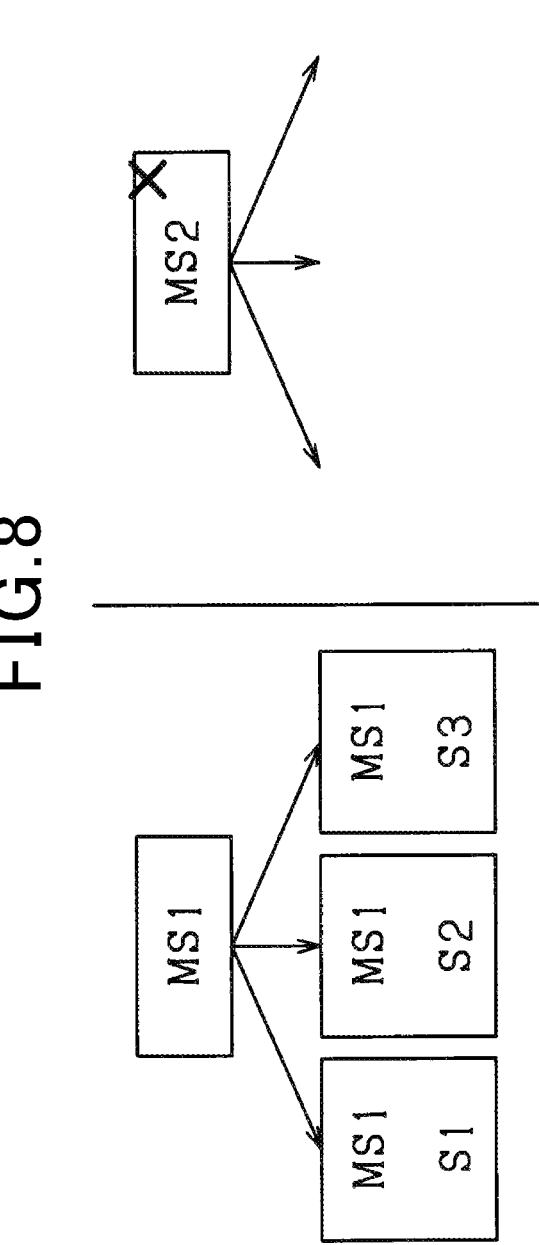

As shown in FIG. 8, the setting unit 43 prohibits the user from setting the main scene MS2 that does not have dependent sub-scenes MS2Sm that should be dependent on the main scene MS2. As a result, when the sub-scenes MS2Sm are not dependent on the main scene MS2, it is possible to prevent incorrect sub-scenes from becoming dependent on the main scene MS2. Furthermore, it is possible to always make the user set at least one sub-scene MS2Sm in the level below the main scene MS2 in the hierarchy. It is possible to prevent sub-scenes that are dependent on a different main scene from also being used in the main scene MS2.

The switching unit 32 switches the scene applied to the robot 10, for example, by a ChangeScene MS1S1 command, to a scene which is a combination of the main scene MS1 and the sub-scene MS1S1. In this case, the limit parameters set in the main scene MS1 and the limit parameters set in the sub-scene MS1S1 are applied to the robot 10.

Figure 10:
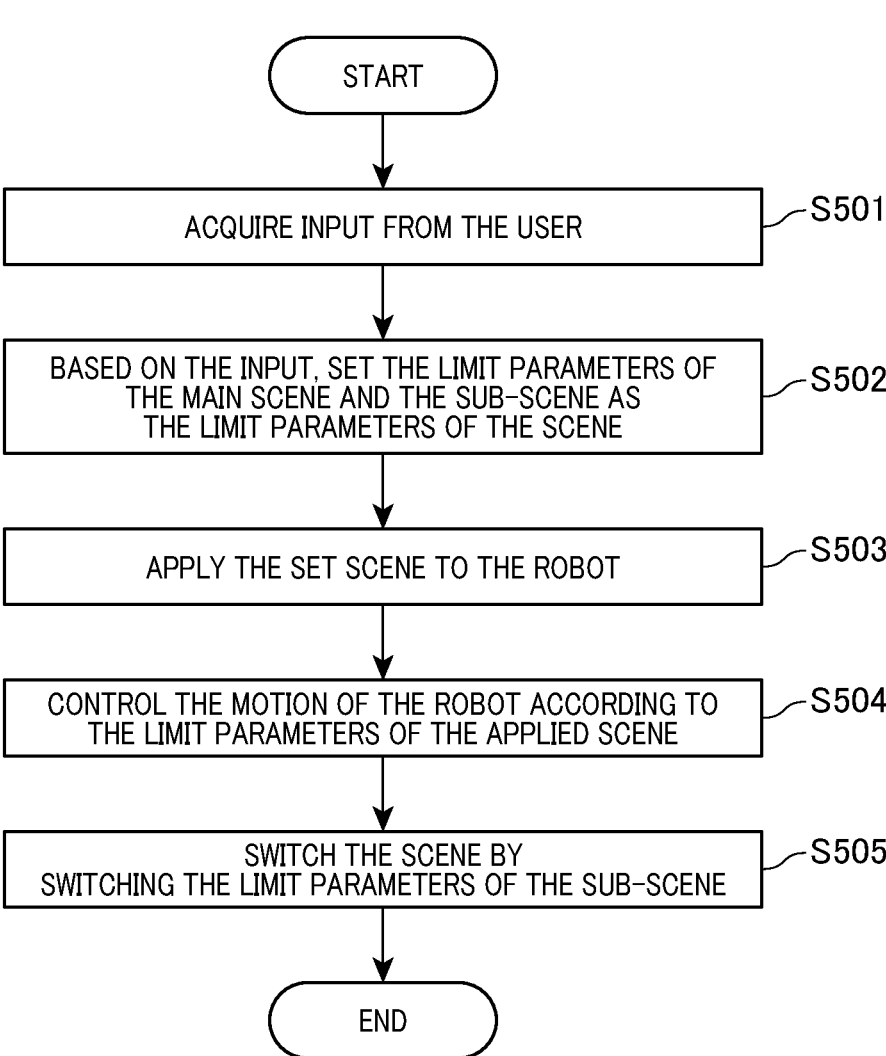
FIG. 10 is a flowchart of a robot control system according to an embodiment of the present disclosure.

The processing performed by the robot control system 1 according to an embodiment of the present disclosure will be described with reference to FIG. 10.

The robot control system 1 acquires input from the user (step S501). For example, the setting unit 43 acquires input from the user via the operation unit 42. The input from the user represents the limit parameters of the main scene and the limit parameters of the plurality of sub-scenes that are dependent on the main scene.

Based on the input from the user, the robot control system 1 sets the limit parameters of the main scene and the limit parameters of the sub-scene as the limit parameters of the scene (step S502). For example, the setting unit 43 sets the limit parameters of the main scene and the limit parameters of one of the plurality of sub-scenes that have been input by the user as the limit parameters of the scene. The scene in which the limit parameters have been set is defined in the motion program.

The robot control system 1 applies the set scene to the robot 10 (step S503). For example, the robot control device 30 executes the motion program, and the switching unit 32 applies the scene defined in the motion program to the robot 10.

The robot control system 1 controls the motion of the robot 10 according to the limit parameters of the scene that has been applied (step S504). For example, the motion unit 33 controls the motion of the robot 10 according to the limit parameters of the scene that has been applied to the robot 10.

The robot control system 1 switches the scene by switching the limit parameters of the sub-scene (step S505). For example, when a switch in the scene (that is, ChangeScene) is instructed in the motion program, the switching unit 32 switches the limit parameters of the scene by switching the limit parameters of the sub-scene based on the specified scene name.

The present embodiment described above has the following advantages.

The setting unit 43 sets a scene that includes, as configuration elements, a plurality of limit parameters for limiting the motion of the robot 10 based on limit parameters input by the user. Consequently, by inputting the plurality of limit parameters, which are the configuration elements of the scene, the user is capable of collectively setting the plurality of limit parameters for the whole scene. The switching unit 32 switches the scene by applying one of the plurality of set scenes to the robot 10. Consequently, as a result of switching the scene that is applied to the robot 10, the plurality of limit parameters that are applied to the robot 10 can be switched at once, and the plurality of limit parameters can be easily changed. The motion unit 33 causes the robot 10 to move in a state where the motion of the robot 10 is limited by the limit parameters set to the scene applied to the robot 10. Therefore, the robot 10 can be appropriately controlled based on the set limit parameters.

The setting unit 43 is provided with the main scene and the plurality of sub-scenes that are dependent on the main scene, and sets the scene by a combination of the limit parameters representing the configuration elements of the main scene, and the limit parameters representing the configuration elements of the sub-scene. Consequently, the user can organize each scene as a combination of a main scene and one of a plurality of sub-scenes that is dependent on the main scene. As a result, when the plurality of limit parameters are each set according to many circumstances, it is possible to prevent the user from incorrectly setting the limit parameters. Here, in the robot control device 30 (that is, the robot control system 1), when an incorrect limit parameter is set, there is a concern that the robot 10 may cause adverse effects toward the surrounding environment or humans. Therefore, it is very important to prevent incorrect limit parameters from being set.

In other words, according to an embodiment of the present disclosure, there is provided a robot control system 1 comprising a processor (e.g. processor 301 and processor 401) and a memory (e.g. memory 302 and memory 402), wherein the memory stores a program that is executed by the processor, and the processor sets a plurality of limit parameter sets for limiting a motion of the robot 10 based on an input by a user, in which each of the plurality of limit parameter sets corresponds to a scene in which the robot 10 moves, and includes a main parameter set and one of a plurality of sub-parameter sets, the main parameter set including at least one limit parameter, each of the plurality of sub-parameter sets including at least one limit parameter, and the plurality of sub-parameter sets being dependent on the main parameter set, applies one of the set plurality of limit parameter sets to the robot 10, controls a motion of the robot 10 according to applied one of the plurality of limit parameter sets, and switches the plurality of limit parameter sets at least by switching one of the plurality of sub-parameter sets.

As described above, since the structure of the limit parameter set corresponding to each scene has a main parameter set and one of a plurality of sub-parameter sets, limit parameters that are shared by a plurality of scenes corresponding to the plurality of sub-parameter sets can be used as the main parameter set. As a result, the user is capable of setting limit parameters that are shared by the plurality of scenes by only setting the main parameter set. In other words, the limit parameters that are shared by the plurality of scenes are set only once. From an alternative viewpoint, it can be said that the number of limit parameters that are set by the user is reduced. Therefore, the workload associated with setting the limit parameters corresponding to the scene in which the robot 10 is moving can be reduced.

Furthermore, the input by the user may include an input of the main parameter set and the plurality of sub-parameter sets, and a dependency relationship between the main parameter set and the plurality of sub-parameter sets. With this, the user can specify the dependency relationship between the main parameter set and the plurality of sub-parameter sets.

The setting unit 43 prohibits the sub-scene MS1S3, which is dependent on the main scene MS1, from being dependent on the main scene MS2, which is different from the main scene MS1. In other words, the processor rejects the input by a user in a case where one of the plurality of sub-parameter sets is dependent on the main parameter set and another main parameter set. As a result, it is possible to prevent the sub-scene MS1S3, which is dependent on the main scene MS1, from also being used in the main scene MS2, which is different from the main scene MS1. Therefore, it is possible to prevent the sub-scene MS1S3, which is not suitable for the main scene MS2, from being applied to the robot 10. Also, because the sub-scenes are set on the assumption that they are dependent on one main scene, if a sub-scene is dependent on a plurality of main scenes, the sub-scene should not be dependent on others of the plurality of main scenes. Therefore, by not allowing the sub-scenes to be dependent on a plurality of main scenes, it is possible to prevent the sub-scenes from being dependent on an incorrect main scene.

The setting unit 43 prohibits setting of the main scene MS2 that does not have the dependent sub-scenes MS2Sm. In other words, the processor rejects the input by a user in a case where the plurality of sub-parameter sets is not dependent on the main parameter set. As a result, when only the main scene MS2 is set and the sub-scenes MS2Sm are not set, it is possible to prevent incorrect sub-scenes from becoming dependent on the main scene MS2. Therefore, it is possible to prevent sub-scenes that are not suitable for the main scene MS2 from being applied to the robot 10.

As described above, by providing a rule that relates to the dependency relationship between the main scene MSn and the sub-scenes Sm, it is possible to prevent settings that violate the rule. As a result of the user correcting the settings that violate the rules, the safety of the limit parameters applied to the robot 10 can be enhanced. Consequently, the robot 10 can be moved using limit parameters whose safety has been confirmed by the user, and dangerous motion of the robot 10 can be suppressed.

The plurality of sub-scenes MS1S1, MS1S2 and MS1S3 that are dependent on the shared main scene MS1 share the limit parameters of the shared main scene MS1. As a result of the user making the plurality of the sub-scenes MS1S1, MS1S2 and MS1S3, which share the limit parameters of the main scene MS1, dependent on the main scene MS1, the limit parameters of the shared main scene MS1 can be associated with the plurality of sub-scenes MS1S1, MS1S2 and MS1S3. Consequently, the work of the user setting the limit parameters of the shared main scene MS1 with respect to each of the plurality of sub-scenes MS1S1, MS1S2 and MS1S3 can be reduced. Also, at least one of the plurality of sub-parameter sets is limited by the main parameter set on which the plurality of sub-parameter sets is dependent. With this, the critical limits that are shared by the plurality of sub-scenes can be set in the main scene, and the limits individually required for each of the plurality of sub-scenes can be set in each of the plurality of sub-scenes. In other words, relatively loose limits can be set in the main scene, and relatively tight limits can be set in each of the plurality of sub-scenes.

The main scene includes limit parameters that limit the movable range (that is, the movable area) of the robot 10. In other words, the main parameter set includes a parameter that indicates a movable range of the robot 10. In this way, by treating the parameters of the movable range that tend to be shared by a plurality of scenes as the parameters of the main scene, it is possible to effectively reduce the user workload associated with setting the parameters.

The main scene includes a parameter (an activation setting of safety observation) that activates or deactivates the limit parameters of the sub-scenes that are dependent on the main scene. In other words, the main parameter set includes a parameter that activates or deactivates a limit parameter of the plurality of sub-parameter sets that are dependent on the main parameter set. In this way, by setting whether limits are activated in the main scene, and setting the details of the specific limits in the sub-scenes, stepwise setting of the limit parameters is possible.

The sub-scenes include a parameter (that is, a scene switching condition) that indicates the condition under which switching to that sub-scene is allowed. In other words, the plurality of sub-parameter sets each include a parameter representing a condition that allows switching to the sub-parameter set. Consequently, in a state that is not the scene of the set condition, it is possible to prevent the limits of that scene from being applied to the motion of the robot 10. As a result, it is possible to prevent the motion of the robot 10 from being excessively limited or insufficiently limited.

The embodiment described above may be implemented with the following modifications. The parts that are substantially the same as those of the embodiment described above are denoted by the same reference numerals, and the descriptions thereof are omitted.

The main scene and the sub-scene may each contain shared limit parameters that limit the motion characteristics of the robot 10. In other words, the main parameter set and the plurality of sub-parameter sets each include a limit parameter relating to the same motion characteristic, and the limit parameter relating to the motion characteristic in the plurality of sub-parameter sets is limited by a limit parameter relating to the motion characteristic in the main parameter set on which the plurality of sub-parameter sets are dependent. For example, the main scene may include a limit parameter that limits the maximum speed (an example of a shared motion characteristic), and the sub-scenes may include a parameter that represents an allowed speed percentage relative to the maximum speed set in the main scene (for example, 30% of the maximum speed). Furthermore, the main scene may include a limit parameter that limits the maximum torque (an example of a shared motion characteristic), and the sub-scenes may include a parameter that changes the maximum torque within the maximum torque set in the main scene. As a result, the critical limits that are shared by a plurality of scenes can be set in the main scene, and the limits individually required by each of the plurality of scenes can be set in the sub-scenes. In other words, relatively loose limits can be set in the main scene, and relatively tight limits can be set in the sub-scenes. In this way, for the shared motion characteristics of the robot 10, parameters for the sub-scenes can be flexibly set under the influence of the main scene.

The robot control device 30 may include a scene that is initially set (that is, initial values of the limit parameter set). For example, DefaultScene may be provided. DefaultScene is set in advance, and the user is unable to change DefaultScene. In DefaultScene, the values of each parameter for the main scene MSn and the sub-scenes Sm are set to values that allow the robot 10 to move safely. The switching unit 32 applies Default-Scene to the robot 10 when the robot control device 30 (that is, the robot control system 1) is started. As a result, the value of each limit parameter can be initialized. For example, in a case where DefaultScene is set to safe values, the robot control device 30 can transition to a safe state at an arbitrary timing such as when the robot control device 30 is started or when an error occurs.

The motion of the robot 10 and the process of the robot control device 30 in the robot control system 1 may be simulated by a simulator. For example, the motion of the robot 10 is displayed as a simulation image, and the simulated robot control device 30 controls the robot 10 displayed as the simulation image. The simulation device may be, for example, the teaching pendant 40. In this case, the teaching pendant 40 also has a function of simulating the motion of the robot 10. In the simulation, the teaching pendant 40 simulates the function of the switching unit 32 and the motion unit 33 (that is, robot control device 30) by executing the motion program of the robot 10. For example, the display unit 41 displays a simulation image of the robot 10 and the motion program. As a result, after the user confirms the execution result of the motion program using the simulation device, the actual robot 10 can be moved using the motion program. Furthermore, because only the simulation device is used instead of the robot 10 and the robot control device 30, the same effects as those of the embodiment described above can be obtained in the simulation. It is noted that the robot control device 30 may not be simulated. For example, the robot control device 30 may execute the motion program and input signals for controlling the robot 10 to the simulation device. The simulation device may simulate the motion of the robot 10 based on the input signals.

Instead of the teaching pendant 40, the function of the teaching pendant 40 may be realized by using a combination of a PC (personal computer), a monitor, a keyboard, a mouse, and the like, that have been connected to the robot control device 30.

The invention claimed is:

1. A robot control system comprising a processor and a memory, wherein the memory is configured to store a program that is executed by the processor, the processor is configured to:

set a plurality of limit parameter sets for limiting a motion of the robot based on a user input, in which each of the plurality of limit parameter sets corresponds to a scene in which the robot moves and includes a main parameter set and one of a plurality of sub-parameter sets, the main parameter set includes at least one limit parameter for limiting the motion of the robot, each of the plurality of sub-parameter sets includes at least one limit parameter for limiting the motion of the robot, the plurality of sub-parameter sets is dependent on the main parameter set, and the motion of the robot is performed by executing a motion program;

apply one of the set plurality of limit parameter sets to the robot;

cause the robot to move in a state where the motion of the robot performed by executing the motion program is limited according to the applied one of the set plurality of limit parameter sets; and switch the plurality of limit parameter sets at least by switching one of the plurality of sub-parameter sets, a sub-parameter set of the plurality of sub-parameter sets includes a parameter representing a condition that allows switching to the sub-parameter set itself, and the processor is configured to, when it is determined that a position of the robot is in a predetermined position, determine that the condition is satisfied and apply limits based on the sub-parameter set of the plurality of sub-parameter sets to the motion of the robot being performed by the motion program under execution.

2. The robot control system according to claim 1, wherein the user input includes an input of the main parameter set and the plurality of sub-parameter sets, and a dependency relationship between the main parameter set and the plurality of sub-parameter sets.

3. The robot control system according to claim 2, wherein the processor is configured to reject the user input in a case where one of the plurality of sub-parameter sets is dependent on the main parameter set and another main parameter set.

4. The robot control system according to claim 2, wherein the processor is configured to reject a user input in a case where a plurality of sub-parameter sets is not dependent on a main parameter set.

5. The robot control system according to claim 1, wherein at least one of the plurality of sub-parameter sets is limited by the main parameter set on which the plurality of sub-parameter sets is dependent.

6. The robot control system according to claim 1, wherein the main parameter set includes a parameter that indicates a movable range of the robot.

7. The robot control system according to claim 1, wherein the main parameter set includes a parameter that activates or deactivates a limit parameter of the plurality of sub-parameter sets that are dependent on the main parameter set.

8. The robot control system according to claim 1, wherein the main parameter set and the plurality of sub-parameter sets each include a limit parameter relating to a same motion characteristic, and the limit parameter relating to the motion characteristic in the plurality of sub-parameter sets is limited by a limit parameter relating to the motion characteristic in the main parameter set on which the plurality of sub-parameter sets are dependent.

\* \* \* \* \*